United States Patent [19]

Brown et al.

[11] Patent Number: 5,392,290
[45] Date of Patent: Feb. 21, 1995

[54] SYSTEM AND METHOD FOR PREVENTING DIRECT ACCESS DATA STORAGE SYSTEM DATA LOSS FROM MECHANICAL SHOCK DURING WRITE OPERATION

[75] Inventors: Dana H. Brown; Kevin J. Erickson; Daniel L. Good; Richard Greenberg, all of Rochester; Peter M. Herman, Oronoco; Hal H. Ottesen, Rochester, all of Minn.

[73] Assignee: International Business Machines Corporation, Armonk, N.Y.

[21] Appl. No.: 922,453

[22] Filed: Jul. 30, 1992

[51] Int. Cl.$^6$ .................. G06F 11/08; G06F 11/14; G11B 20/18
[52] U.S. Cl. .................. 371/10.1; 371/10.2; 371/12; 371/40.1; 395/575
[58] Field of Search .................. 371/12, 10.1, 10.2, 371/40.1; 395/575

[56] References Cited

U.S. PATENT DOCUMENTS

| | | | |
|---|---|---|---|
| 3,320,598 | 5/1967 | Star | 360/47 |
| 3,631,426 | 12/1971 | Appelt | 360/47 |
| 3,704,363 | 11/1972 | Salmassy et al. | 371/29.1 |
| 3,729,725 | 4/1973 | Denney et al. | 360/47 |
| 4,214,280 | 7/1980 | Halfhill et al. | 360/53 |
| 4,558,446 | 12/1985 | Banba et al. | 360/53 X |
| 4,730,290 | 3/1988 | Takasago et al. | 369/54 X |
| 4,833,665 | 5/1989 | Yokumitsu et al. | 360/53 X |
| 5,126,895 | 6/1992 | Yasuda et al. | 360/77.07 |

FOREIGN PATENT DOCUMENTS 0260722 3/1988 European Pat. Off.

OTHER PUBLICATIONS

IBM Technical Disclosure Bulletin, vol. 28, No. 1, Jun. 1985, pp. 356–357, "Disk Rotational Delay Eliminator".
IBM Technical Disclosure Bulletin, vol. 22, No. 6, Nov. 1979, pp. 2185–2186, "Continuous Recording for a Unit Media Dictation Recorder" by R. L. James.

Primary Examiner—Stephen M. Baker
Attorney, Agent, or Firm—Richard E. Billion; Andrew J. Dillon

[57] ABSTRACT

A secondary data storage system for a host computer system includes a disk drive system having a device controller, at least a first magnetic disk and a read/write magnetic transducer positionable with respect to a recording surface of each magnetic disk. A write operation exposes data on adjacent tracks to potential damage if an off track condition occurs to the transducer during a write. A method for controlling write operations through the device controller provides backup of data in tracks adjacent to a target track for the write operation prior to the write operation occurring. The method detects occurrence of events resulting in an off track condition of the magnetic transducer relative to a target track. Occurrence of such an event triggers a determination of damage to the contents of tracks adjacent to the target track and restoration of those tracks. Write operations to the target track are blocked until shock events discontinue.

19 Claims, 8 Drawing Sheets

SYSTEM AND METHOD FOR PREVENTING DIRECT ACCESS DATA STORAGE SYSTEM DATA LOSS FROM MECHANICAL SHOCK DURING WRITE OPERATION

BACKGROUND OF THE INVENTION

1. Technical Field

This invention relates to Winchester type (hard drive) disk drive systems and more particularly to a system and method for protecting data stored on a disk in a disk drive system from loss as a result of mechanical shock to the system. Still more particularly, the invention relates to preventing data loss in disk drive systems as a consequence of failure of a magnetic head to remain on track during a write operation.

2. Description of the Related Art

A disk drive is an information storage device which utilizes at least one rotatable magnetic disk to store information. The information is represented on the disk as a series a magnetically polarized regions. The magnetic regions are arrayed along the surface of the disk along either a plurality of concentric data tracks or spiral data tracks.

A transducer reads information from or writes information to the various tracks on the disk while the disk moves underneath the transducer. The transducer forms a portion of a "head" which is attached to a slider. The slider is a carrier body which "flies" just off the surface of the disk. The slider is attached on its backside to a suspension system which in turn is connected to an actuator arm. The actuator arm is used to selectively position the head over one particular desired track during a read or write operation. The disk is spun bringing the magnetically polarized regions by the head one after another. The slider itself may be moved radially inward or outward to change the track over which the slider is positioned.

The rotation of the disk results in the relative movement between a surface of the disk and the slider. In a so called hard drive, this in turn creates a cushion of air between the disk and the slider forcing the slider and the disk apart. Separation of the slider and disk reduces wear and consequent premature destruction of the components. The face of the slider toward the disk is known as the air bearing surface. The suspension system provides dimensional stability between the slider and the actuator arm by compensating for the force of the air between the air bearing surface and the disk surface as well as providing rapid motion damping of the slider following its repositioning from one track to another. The suspension system should control slider position relative to its directions of motion between tracks while resisting out-of-plane movement relative the preferred "fly height", i.e. the spacing between slider and disk surface. At no time during data read or write operations of the drive should the slider come into contact with the disk surface.

The suspension typically comprises a load beam attached to the actuator arm and a flexure which connects the slider to the load beam. The load beam balances the slider by counteracting the lifting force from the spinning disk. The flexure supports the slider and allows flexibility during the slider's ride on the cushion of air.

Design of the slider air bearing surface, the suspension system and the actuator arm are directed to achieving a low mass and a high degree of positional stability in a selected position. In doing so the designers must take into account a number of factors. For example, lift from the air cushion between slider and disk change as the slider is moved radially over the disk by the actuator arm and the relative speed of the slider over the disk changes. Where the slider is mounted on a rotary actuator arm (having a movement similar to the tone arm of a phonograph player), the slider rotates relative to its track over the disk changing the interaction between the air bearing surface and the air cushion. However, all of these problems are vastly complicated by the possibility of exposure of the disk drive to mechanical shock. The actuator, being by its nature a movable device, will tend to lag behind the magnetic disks, thereby throwing the head and track out of alignment.

In most computers, for example, floor or desk top personal computers, severe shocks tend to be rare. In addition, the disk drive can be protected from some shocks by mounting it in the computer surrounded by shock absorbing material. In increasingly popular portable computers, the possibility of mechanical shock is greater. Such computers are frequently used "on the move" in vehicles or in crowded locations where the occurrence of mechanical shocks is more frequent. If such a shock occurs during a write operation, and the head is left off track, two undesirable things can result. One is that the data being written will not be in the desired location, but may be split between the desired track and adjacent tracks, or lost between tracks. The second undesirable result is that data previously recorded on the tracks adjacent to the target track may be partly overwritten.

A portable computer, due to energy requirements and space limitations generally will rarely provide common backup tools such as a tape drive and certainly will not have access to more esoteric data storage systems such as parallel arrays of independent disk drives (RAID systems) affording the possibility of distributed storage of data among a plurality of disk drives with sophisticated error recovery systems using such distribution. Even were a system such as RAID available, all of the drives would be part of one package in a portable computer and thus all would be exposed to the same mechanical shocks.

It is an object of the invention to provide a method of operating a Winchester type disk drive system in a portable computer providing for protecting data stored on a disk in a disk drive system.

It is still another object of the invention to prevent loss of data as a consequence of failure of a magnetic head to remain on track during a write operation.

It is yet another object of the invention to prevent data loss in disk drive systems as a result of mechanical shock to the system.

SUMMARY OF THE INVENTION

Other objects, features and advantages will be apparent in the written description of the invention that follows. A secondary data storage system for a host computer system includes a disk drive system having a device controller, at least a first magnetic disk and a read/write magnetic transducer positionable with respect to tracks on a recording surface of each magnetic disk. A write operation exposes data on adjacent tracks to potential damage if an off track condition occurs to the transducer during a write. A method for controlling write operations through the device controller provides backup of data on tracks adjacent to a target track for the write operation prior to the write operation occurring.

The backup of data can occur under two different conditions. The conditions are (1) before the target track for a write operation is identified and (2) after the target track has been identified. Data back up under the first condition saves time during the subsequent write operation while data back up under the second condition saves data storage capacity in the disk drive.

Data back up under the two conditions identified above is tailored to the condition. Where data is backed up without prior identification of a target track, each track having data is potentially an "adjacent" track. Thus any data backup scheme must provide some way of recovering from damage to any track. Data backup is provided by some scheme of data redundancy. The computer itself is subject to being shut down prior to the time data backup is completed, and accordingly, the redundant data must be in nonvolatile memory. A portable computer, due to energy requirements and space limitations generally will have only one hard drive unit, which in turn may have only one or two disks mounted on a single spindle. A location having sufficient capacity for redundant data which is also nonvolatile, is the disk drive itself.

Among the data redundancy schemes which may be utilized are (1) data mirroring and (2) parity or error correction code (ECC). If data mirroring is utilized, data and back up data can be written to mutually spaced locations on one disk surface, or the data and back up data can be written to different surfaces, such as the top and bottom surfaces of one disk. Either scheme costs fifty percent of drive capacity. In other words a 200 Mbyte file will lose 100 Mbytes to the data redundancy scheme. Some time is lost by writing sectors to each of two locations. Where the data and back up data are written to the same surface, they are preferably written to one track, but spaced so that their positions are opposed to one another across the disk. Writing data and back up data to different surfaces has an advantage in allowing data recovery in case of failure of the magnetic head used with one of the surfaces.

Utilization of parity or error correction code substantially reduces the cost in terms of disk drive capacity to effect a redundancy scheme, but write operations may take even longer than in a mirroring scheme. To effect a parity data redundancy scheme groups of sectors are organized. A typical group would include all the sectors on a track. One or two sectors of the group is set aside for parity information generated across the data in the remaining sectors of the group. With each overwrite of a sector in the group the parity for the group would have to be calculated and the parity sector also overwritten. Thus a write operation requires the group to be read first, to permit ongoing recalculation of parity with each sector of the group overwritten.

In operation, a shock to a disk drive results in the head being driven off track during a write operation over onto an adjacent track. The condition is detected upon no later than the next encounter of the head with a track servo field. At that time, the servo system used for positioning the head detects the condition and stops the write operation to avoid damage to more than one sector. Determination is made if damage has been done to a sector of either adjacent track and repairs to those sectors are done before the write operation continues.

Complications or limitations can stem from use of a parity redundancy scheme. No more than one sector can be written between each servo field, possibly entailing a considerable loss of disk capacity. No sector having a bad sector servo field preceding it or preceding adjacent sectors on either adjacent track can be used for data storage. Use of sectors preceded by bad servo patterns cannot be permitted because an off track condition from a preceding data field would not be detected until two sectors had been damaged. While data mirroring is tolerant of multiple sector loss, parity systems are not. Thus, unlike contemporary disk drives, bad servo fields cannot be safely ignored.

An odd/even parity scheme or error correction code can be employed to compensate for the inability of simple parity to tolerate consecutive sector errors. Where odd/even parity is used, alternating sectors are designated odd or even, with each subgroup receiving its own parity sector. Loss of adjacent sectors thus has no effect on the ability to use parity to correct the errors. This allows relaxation of the requirement that every sector in use have perfect servo information preceding it and adjacent sectors. The cost of data mirroring is one half of a disk's capacity. Off track errors are detected as before, however, determination of occurrence of error on the adjacent tracks can be postponed until completion of the write operation giving rise to the error.

If data back up is postponed until identification of a target track, no need exists to back up data on the disk to carry out the method of the invention and thus no cost in terms of disk capacity is incurred. However, a cost in terms of time to carry out a write operation is incurred. Prior to writing to a track, the data from the two adjacent tracks is read and stored in a controller buffer, preferably nonvolatile random access memory (NVRAM). With a data back up in this buffer, the write operation to the target track proceeds. If the write operation occurs without damaging either of the adjacent tracks, the contents of the NVRAM are ignored. If damage occurs, the write operation is repeated until it completes correctly, and then the damaged adjacent track is repaired from the contents of NVRAM. The procedure for repairing a track is identical to a write operation, beginning with a back up operation performed upon the tracks adjacent to the damaged track prior to beginning the write operation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

These drawings are not intended as a definition of the invention but are provided solely for the purpose of illustrating one of the preferred embodiments of the invention described below.

DETAILED DESCRIPTION OF THE INVENTION

Figure 1:
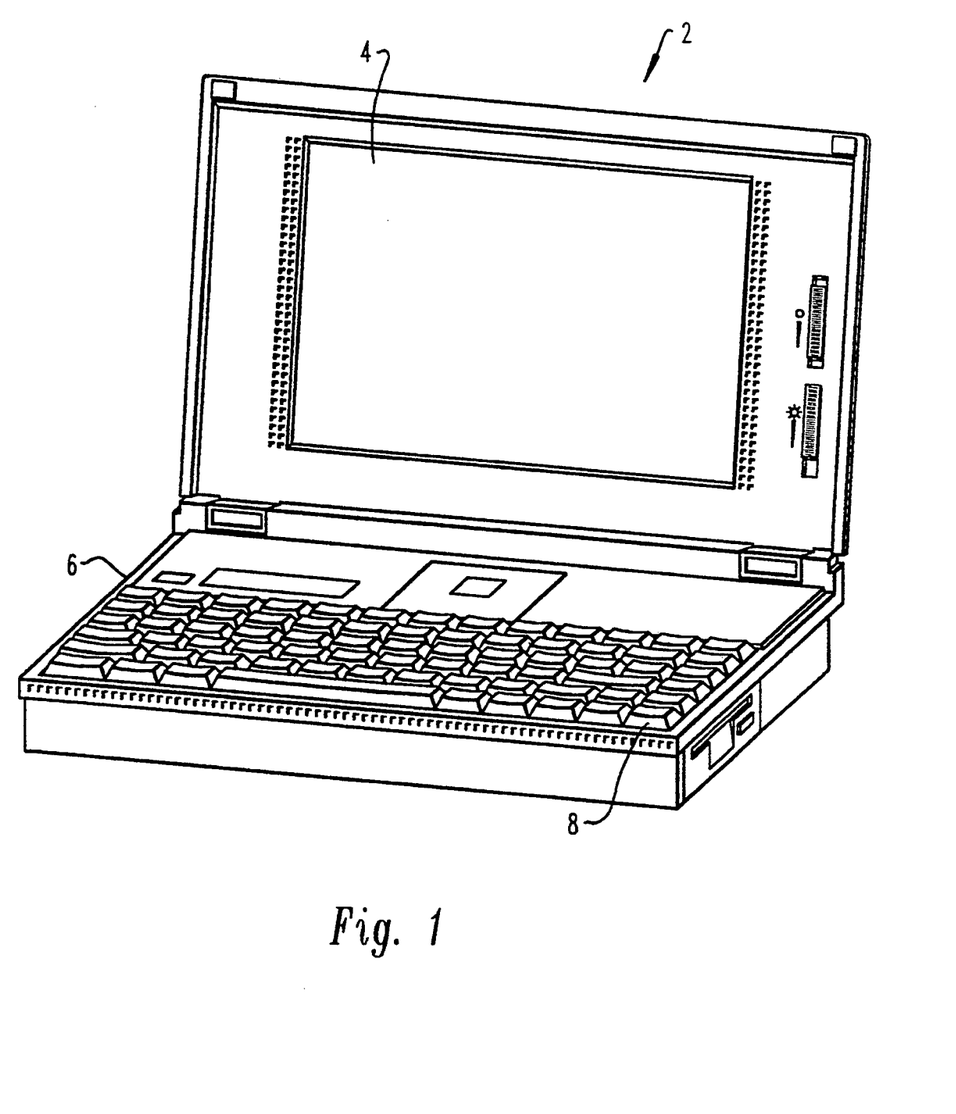
FIG. 1 is a pictorial illustration of a typical lap top computer.

FIG. 1 is a pictorial depiction of a lap top type portable computer 2. Portable computer 2 includes a fold open liquid crystal display 4 and a base unit 6 on which is provided a keyboard 8 and in which is housed a battery, the computer microprocessor and a Winchester type hard disk drive for mass storage of data and programs.

Figure 2:
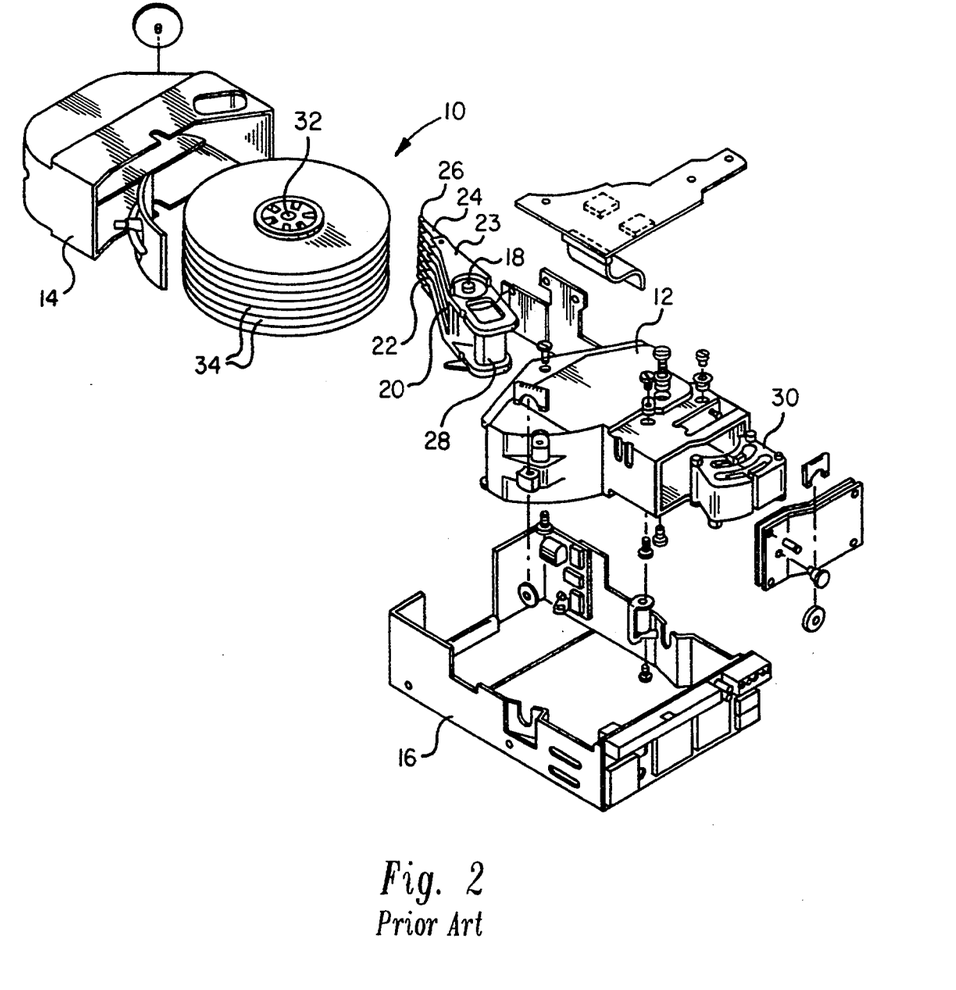
FIG. 2 is an exploded view in perspective of a disk drive from the prior art.

FIG. 2 is an exploded view of disk drive 10. It should be noted that although a rotary actuator is shown, the invention described herein is also applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. In this case, the load springs form the suspension. Attached at the end of each load spring is a slider 26 which carries a pair of magnetic transducers or the head. The transducers may be of an inductive type, or may include a read transducer of a magnetoresistive type. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 18. Also mounted within the housing 12 is a spindle shaft 32. Rotatably attached to the spindle shaft 32 are a number of disks. 34. In FIG. 2, eight disks are attached to the spindle shaft 32. As shown in FIG. 2, the disks 34 are attached to the spindle shaft 32 in spaced apart relation. An internal motor (not shown) rotates the disks 34.

Figure 3:
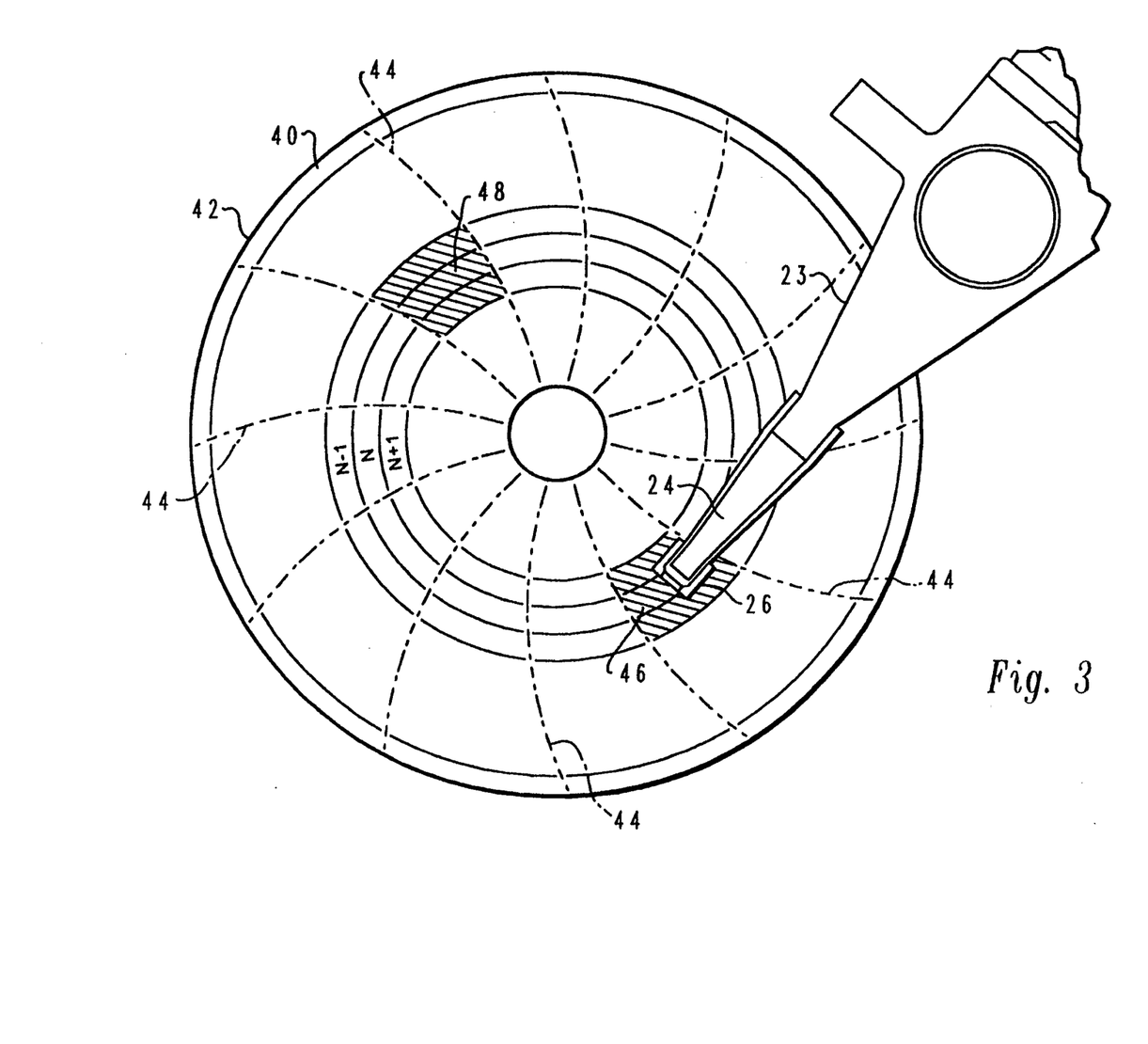
FIG. 3 is a view in top plan of a disk drive incorporating the present invention.

FIG. 3 illustrates positioning of slider 26 by an arm 23 over one of a plurality of tracks (1 to N+1) on a magnetic surface of 40 of a disk 42. Each track is divided into segments or sectors by a plurality of track servo fields 44 extending radially from the center of disk 40. Track servo fields curve to conform to the travel of slider 26 at the end of rotatable arm 23. If disk rotational speed is constant, a transducer mounted to slider 26 encounters a track servo field 44 at strict intervals of times. If a linearly actuated armature is used, track servo fields 44 are straight. Tracking information is derived from servo fields 44 in a manner well known in the art. Slider 26 flies blind between servo fields. If the machine in which the drive is mounted is bumped while the slider is between the servo fields, the disk can literally be moved out from under the slider. The slider will not be returned to the appropriate track until the next servo field is encountered. If a write operation is in progress at the time of the bump, data on a track adjacent to the target track can be overwritten.

Slider 26 is shown following track N, positioned over a segment 46. Where redundant data is written to the disk, it may be written to segment 48. Redundant data in segment 48 may mirror data written to a sector or sectors within segment 46, or it may be parity bits derived from the data in segment 46 and the remaining sectors in track N. In an alternative embodiment, the redundant data may be placed on the opposite surface of the disk.

Figure 4:
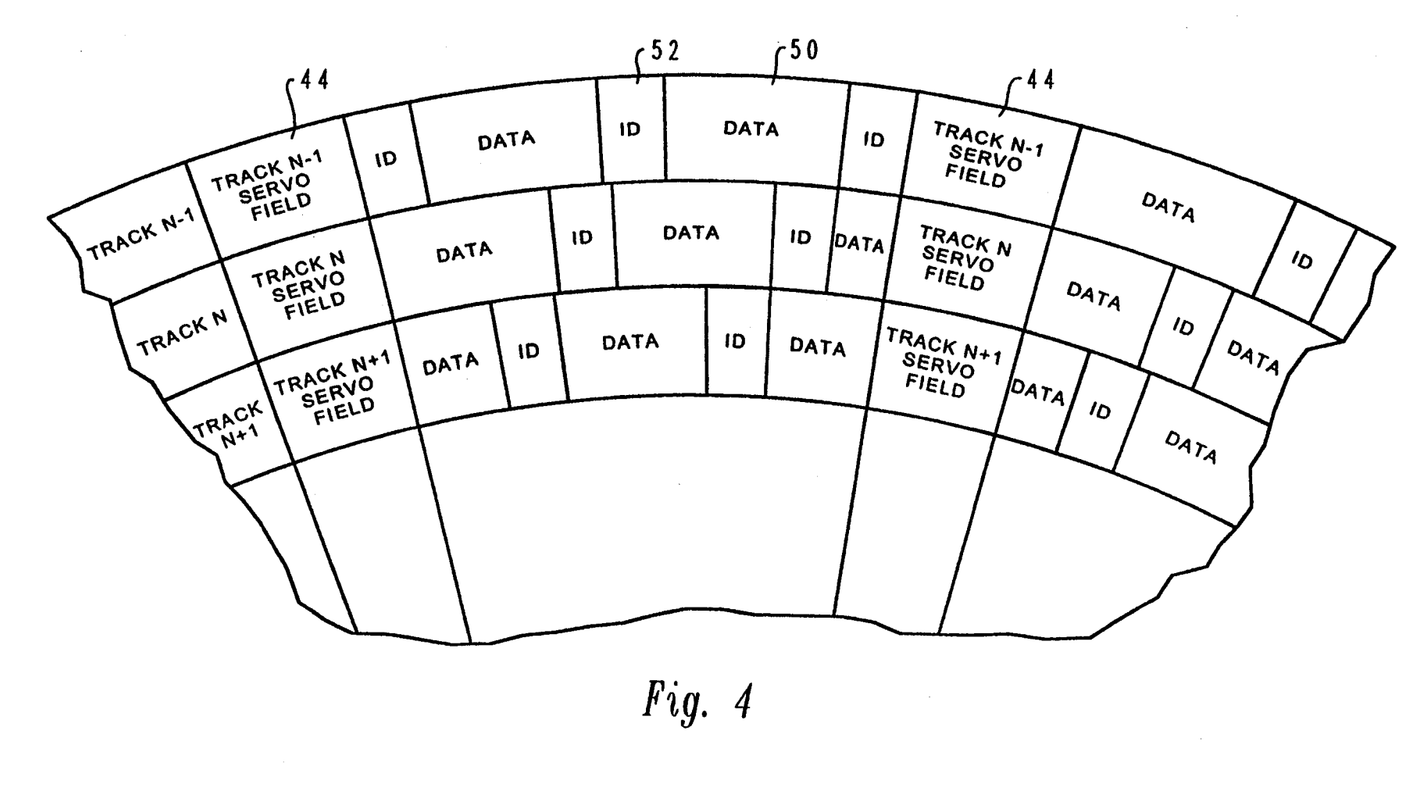
FIG. 4 is a fragmentary view of a portion of the disk drive in FIG. 3 illustrating locations to which data can be written.

FIG. 4 details the positional relationship of data fields to other types of fields on disk 40. Tracks N−1, N, and N+1 are depicted each having had written thereto a plurality of data fields 50. Each data field 50 is preceded by an ID field 52. Data fields can straddle a servo field 44. While a data field generally includes a preliminary synchronization field (not shown), a second synchronization field (not shown) may be included after a servo field where it bisects a data field.

Some disk drives have one data field per data sector positioned between each track servo field. The servo fields function as data sector boundaries. In other types of disk drive, a data field may straddle parts of more than one data sector and thus more than one data field may be positioned between a pair of servo fields. The type of disk drive employed may effect the choice of data redundancy scheme employed to carry out the invention.

Figure 5:
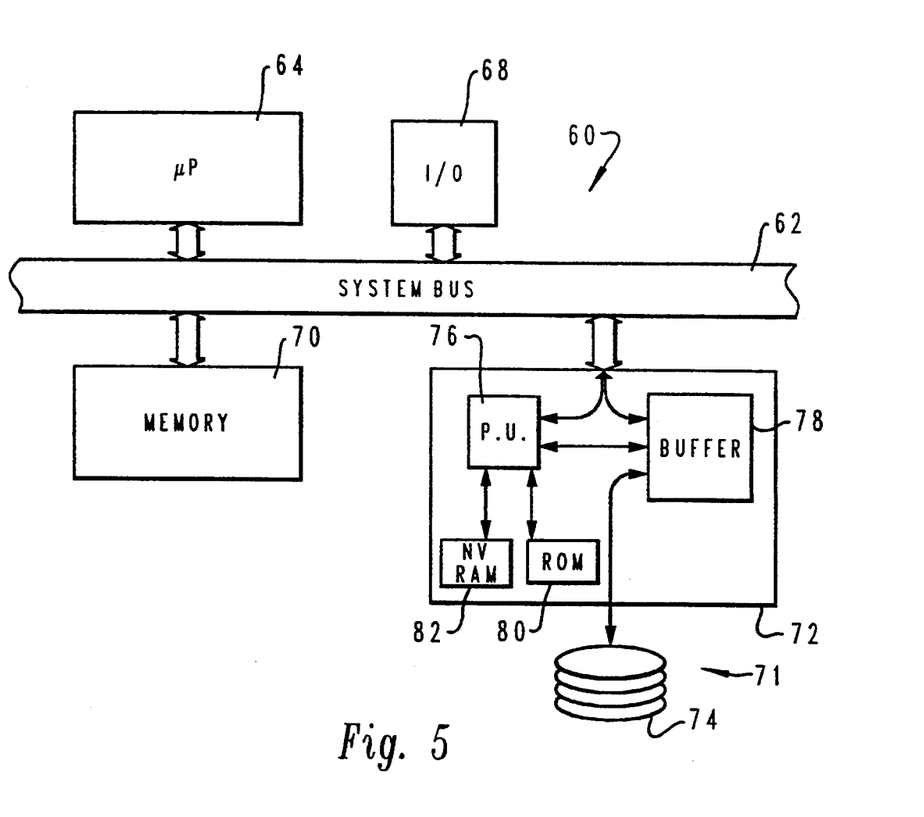
FIG. 5 is a block diagram of a digital computer system incorporating the present invention.

FIG. 5 depicts a computer system 60 in block diagram. Computer system 60 includes a plurality of devices communicating over a system bus 62. Bus 62 includes a data bus and a control line bus. Chief among components which may be attached to the system bus are a microprocessor 64, an input/output (I/O) device 68, a memory 70 and a secondary storage device 71. Secondary storage device 71 includes a device controller 72 and a disk drive 74.

Figure 6:
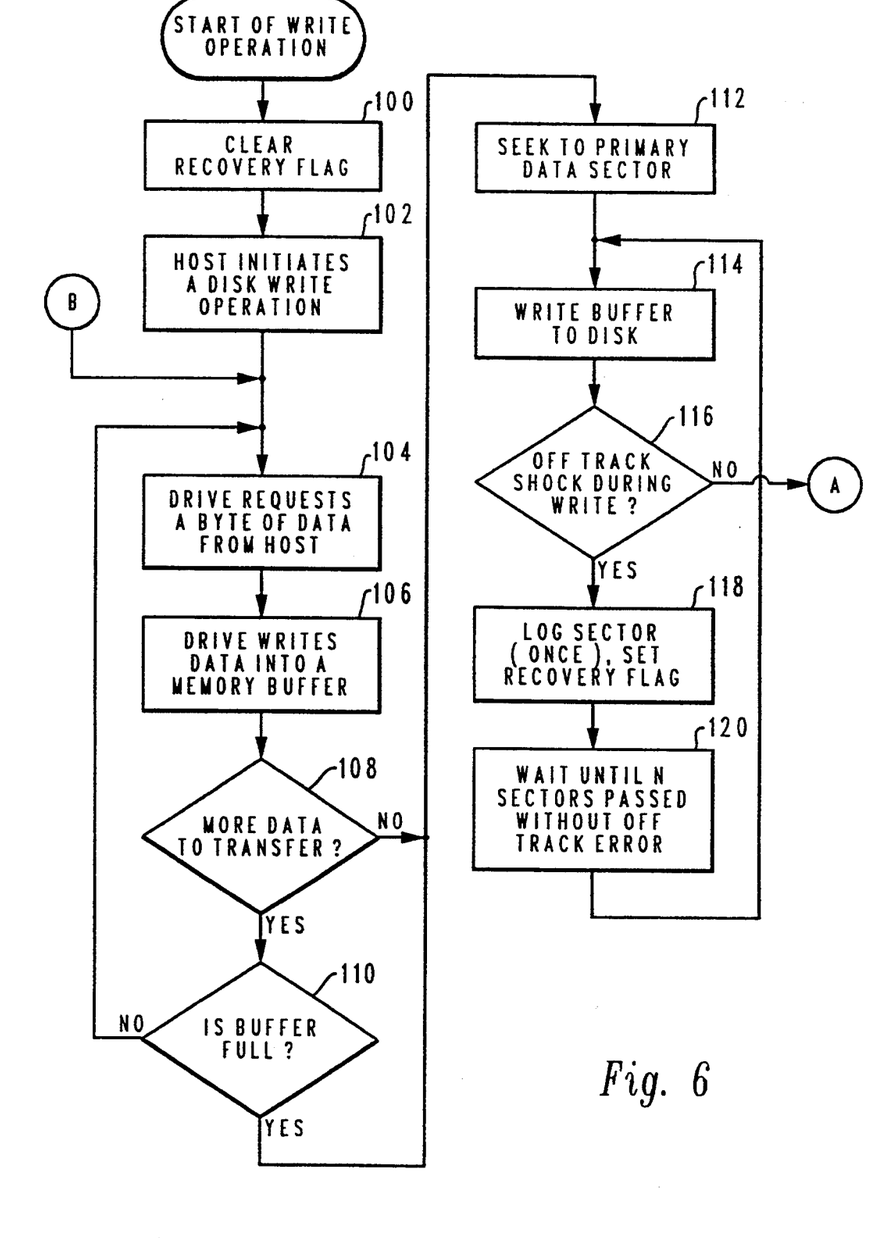
FIG. 6 is a logical flow chart of a process for implementing the present invention on a digital computer system.
Figure 7:
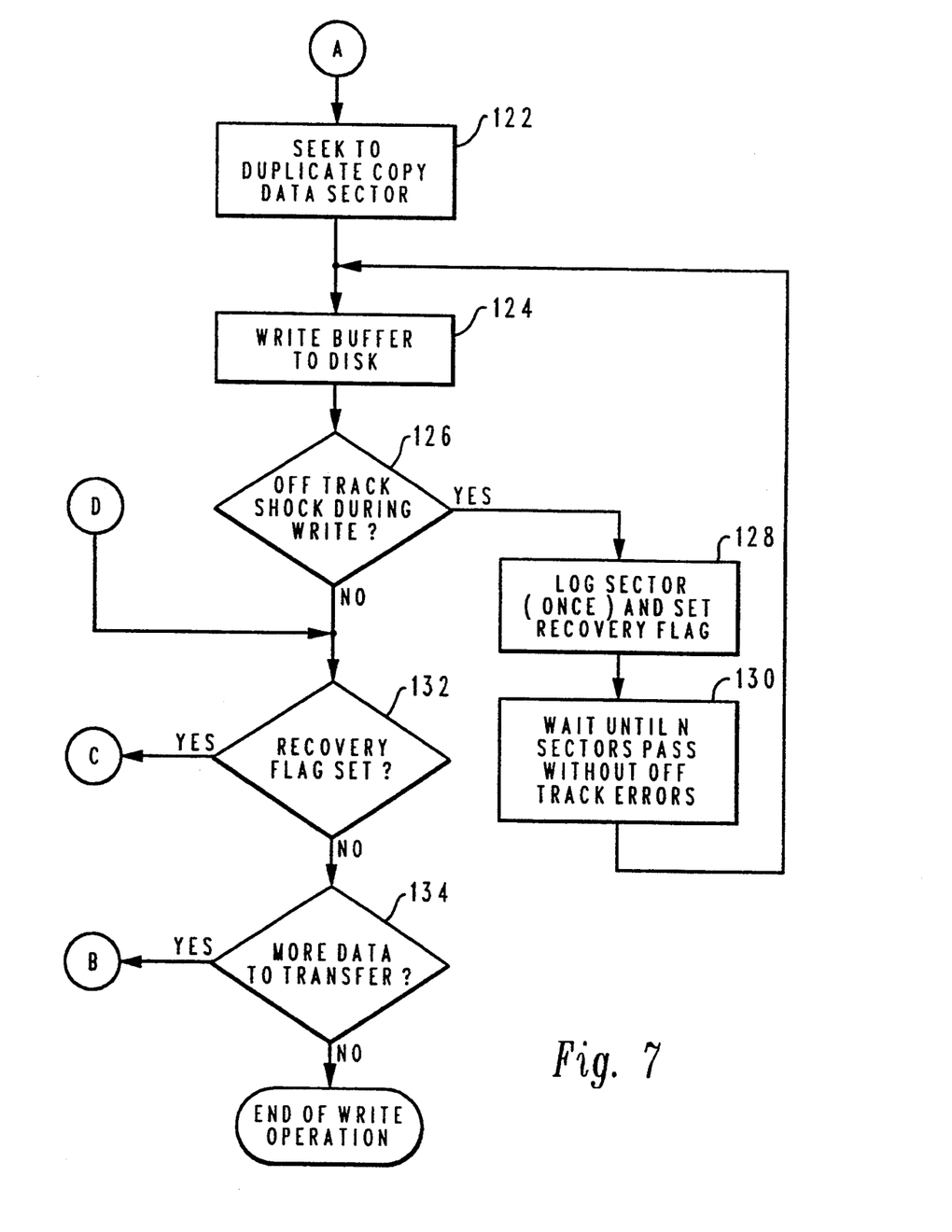
FIG. 7 is a logical flow chart of a process for implementing the present invention on a digital computer system.
Figure 8:
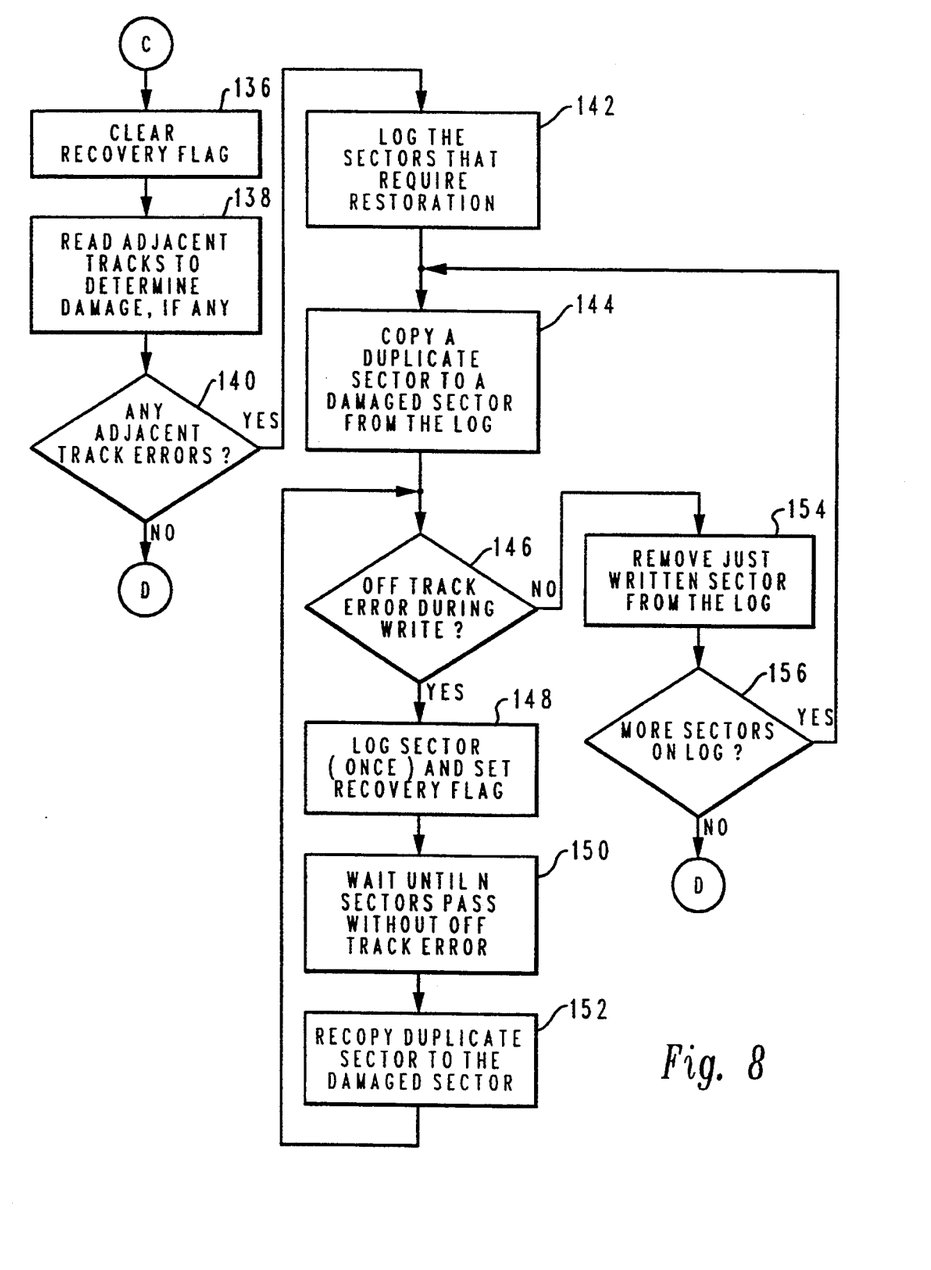
FIG. 8 is a logical flow chart of a process for implementing the present invention on a digital computer system.

Device controller 72 handles the interface for data transfer between disk drive 74 and the devices on system bus 62. Conventionally, device controller 72 includes buffer 78 for temporarily holding data in transit between memory 70 and disk drive 74. Buffer 78 is controlled by a processor unit 76. Processor unit may be initialized upon system power up, or it may have access to a small read only memory (ROM) 80 and a small non-volatile random access memory (NVRAM) 82. ROM 80 holds a program executable on processor unit 76 to carry out the process of the invention. Non-volatile RAM is currently relatively expensive and preferably minimally sized. NVRAM 82 is utilized to store information required to protect the integrity of data previously stored to the disk from loss due to power failure during a write operation effecting the data. The information is either redundant data or logs identifying damaged and potentially damaged sectors. Where a track is identified for a write operation prior to generation of redundant data, redundant data is needed only for sectors exposed to possible damage from a write operation directed to a targeted track. NVRAM 82 is sufficiently large to store temporarily the sectors for the duration of the write operation. Where redundant data is available from the disk, logs identifying sectors requiring repair are preferably stored to NVRAM FIGS. 6, 7 and 8 are high level logical flow charts, illustrating a preferred process for implementing the invention on a data processing system. A write operation is initiated by a request from microprocessor 64.

Redundant data is provided for each sector written to disk drive 74 by repeating the write operation to a second sector. Data to be stored is collected in the drive controller buffer 78, then written to a first sector on the disk. During write operations, if an off track condition of the magnetic transducer is detected, the write operation is interrupted. The write operation is blocked from proceeding until the drive has stabilized. Then a determination of damage to data stored on tracks adjacent the target track is made. Responsive to detection of damage to the data stored on tracks adjacent to the target track, the redundant data is used to repair the data stored on the tracks adjacent the target track.

The process is entered at step 100 by clearing all recovery flags. Next, at step 102, the host initiates a disk write operation. A track is now identified for storage of data sectors for the host. In those embodiments which generate redundant data only upon identification of a target track, processing unit 76 reads data from tracks adjacent to the track just identified into non-volatile storage. In embodiments utilizing parity to provide redundant data, the target track is read for purposes of recalculating parity once the new data has been transferred from the host system. Steps 104 through 110 are executed to collect a block of data for storage.

At step 104 processing unit 76 requests a byte of data from computer system 60. Upon receipt of the byte, it is written into memory buffer 78 (step 106). Next, at step 108 it is determined if all data to be transferred to mass storage has been sent. If more data remains to be sent, decision step 110 is taken to determine if all space allocated in buffer 78 for a storage operation has been filled. If not, an additional byte is requested by returning the process to step 104. If the allocated space in buffer 78 is filled, or if no more data remains to be transferred, a block for transfer to storage is complete. Writing of data from the buffer to the disk begins. In those systems so requiring, parity is recalculated and stored to NVRAM.

The write operation of a primary sector on the target track is now described. With execution of step 112 a seek to a data sector for the collected block is made. Next, with execution of step 114, writing of data from the buffer to the disk begins. Step 116 is executed upon encountering a servo field, whether or not step 114 has been completed. Although not explicitly shown, step 114 will be completed before the NO branch from decision step 116 is taken. Once an off track error is determined, the sector for which it occurred is logged and a recovery flag is set (step 118). The log of damaged sectors is kept in NVRAM 82. The write operation is then stopped.

Step 120 indicates that the system waits until a predetermined number of sectors or servo fields have passed without recurrence of an off track error. Only then can the write operation be restarted with return to step 114. Mechanical shocks to a computer system should be relatively rare, keeping the number of errors to be corrected bounded. However, the potential exists for repeated shocks to result in destruction of more sectors than can be fixed during recovery operations. The wait state imposed by step 120 (and comparable steps provided for all write operations) is an attempt to assure that the drive has settled down after occurrence of one shock. Once the write operation has been completed, the NO branch from step 116 is taken to step 122.

Steps 122 through 130 are taken in a system utilizing data mirroring to provide redundant data. Mirroring is a process where redundant data for each sector is provided by duplicating the contents of the sector at a second sector physically displaced from the first. In the prior art, it has typically meant repeating the data on an independent disk drive. In the preferred embodiment, the mirrored data written to the same disk. Immediately after completing writing to one sector, a second sector is written to using the unchanged contents of the buffer. At step 122 a seek operation to the destination sector for the duplicate data is performed. With step 124 a write operation is commenced to the sector. If an off track condition occurs during the operation, the location of the affected sector is logged and a recovery flag is set (step 128). After occurrence of an off track error, step 130 represents waiting a predetermined number of sectors or servo fields until the write operation of step 124 is reattempted. In a system generating redundant data only upon identification of a target track, steps 122 through 130 are omitted.

Once writing of the redundant data sector is completed, step 132 is executed. If a recovery flag has been set it will be detected during step 132, and the process directed along the YES branch to repair possibly damaged tracks. If no recovery flag is set, the process executes decision step 134 to determine if the host computer system has more data to store. Along the YES branch, signifying the host system has more data to transfer, control of the operation is returned to step 104 to collect a block of data. Along the NO branch, signifying no more data remains to transfer to storage, the write operation terminates.

One recovery flag is set for each occurrence of an off track condition during the write operation. Each flag set is checked in turn by execution of a loop comprising steps 136 through 156. Entry and reentry to the loop are controlled by execution of step 132, described above. With detection of a set recovery flag, step 136 is executed to clear the flag. Then step 138 is executed to read the tracks adjacent to the target track. Determination of error depends upon the data redundancy scheme in use. The data read from the adjacent tracks may be compared to the data read from each such track just prior to the write operation, with any difference between the two sets of data for each track signifying damage to the contents of an adjacent track. The duplicate copy was written when the now potentially damaged sector was originally stored. In another embodiment, an entire adjacent track is read and parity is recalculated for comparison to the written parity data in the parity sector for the track. In the preferred embodiment, the contents of a sector on an adjacent track are compared to the contents of a sector holding a duplicate copy of what should be in the first sector.

Where no error is detected, decision step 140 returns control of the process to step 132 for determination if another recovery flag was set. If error has been detected, decision step 140 will advance control of the process to step 142 to begin repair of the damaged sector. With execution of step 142 a log of the sectors damaged on the track is made. The log is stored to NVRAM 82. Then, at step 144, redundant data for a damaged sector identified from the log is used to restore the sector. Again, depending upon the embodiment, particulars of this operation may vary. In the preferred embodiment, the redundant data is read from the disk to buffer 78. Alternatively, where parity used to back up data, the replacement data may have to be calculated from the remaining sectors on the damaged track. After calculation of the duplicate data it may be stored in buffer 78. In some embodiments, redundant data is provided from NVRAM 82 as described above. With a duplicate copy of the data of the sector prior to occurrence of the damage available, a write operation to the sector is commenced.

The recovery write operation is substantially the same as any other write operation once the duplicate data is available. What was an adjacent track now becomes the target track, and the one or two tracks adjacent the new target track become the adjacent tracks to be protected. Accordingly, the embodiment may require reading data from the new adjacent tracks into NVRAM 82 before the write operation occurs. If a parity scheme is in use, the recalculated values for all sectors are retained in NVRAM 82 pending successful completion of the write operation.

An off track condition occurring during the write operation is detected at step 146 upon encountering a servo field 44. Occurrence of an off track condition results in logging the location of the affected sector and setting a recovery flag (step 148). After occurrence of the off track error, step 150 represents waiting a predetermined number of sectors or servo fields until the write operation is allowed to restart (step 152). From step 152 the operation is looped back to decision step 146 until the write operation has been completed. Upon completion of the operation, housekeeping tasks are performed with execution of step 154, including the removal from the log of the sector just repaired. Next, decision step 156 is executed to determine if the log has any remaining entries. The YES branch returns operation to step 144 to determine damage to the logged sector. The NO branch returns control of the process to step 132 to determine if another recovery flag has been set.

The invention overcomes the loss of data stemming from mechanical shock to a disk drive during a write operation. Redundant data to data potentially exposed to damage during write operations is made available before a write operation begins. The method avoids reliance on accelerometers for determination of off track condition of a magnetic transducer occurring during a write operation. The provision of NVRAM further protects data stored to the disk from loss due to a power outage during exposure attendant the repair operations.

While the invention has been particularly shown and described with reference to a preferred embodiment, it will be understood by those skilled in the art that various changes in form and detail may be made therein without departing from the spirit and scope of the invention.

What is claimed is:

1. A secondary data storage system for a host computer system comprises:
    a disk drive system having a device controller, at least a first magnetic disk and a read/write magnetic transducer-positionable with respect a selected one of a plurality of concentric or spiral tracks on a recording surface of each magnetic disk;
    means for generating redundant data for data stored on a magnetic disk of the disk drive system;
    means for detecting an off track condition of a magnetic transducer with respect to a target track on the magnetic disk during a write operation;
    means responsive to detection of the off track condition for stopping the write operation to the magnetic disk and for determining damage to data stored on tracks adjacent the target track; and
    means responsive to detection of damage to the data stored on tracks adjacent to the target track for utilizing the redundant data to repair the data stored on the tracks adjacent the target track.

2. A secondary data storage system as set forth in claim 1, and further comprising:
    means responsive to detection of an off track condition for stopping the write operation until on track operation has been established for a predetermined minimum period and for then restarting the write operation.

3. A secondary data storage system as set forth in claim 1, wherein the means for generating redundant data further comprises:
    means responsive to identification of a target track for reading data from tracks adjacent the target track and for storing the data in a memory buffer.

4. A secondary data storage system as set forth in claim 3, and further comprising:
    means responsive to storage of the data from the adjacent tracks in the memory buffer for allowing a write operation to proceed; and
    means further responsive to detection of damage to data in the adjacent tracks for repeating the write operation to the target track until it completes successfully and for executing a write operation to write the back up data to the adjacent tracks, beginning with backing up data in adjacent tracks to the track undergoing the write operation.

5. A secondary data storage system as set forth in claim 4, wherein the memory buffer is nonvolatile random access memory.

6. A secondary data storage system as set forth in claim 1, wherein the means for generating redundant data further comprises:
    means responsive to a request to back up data without identification of a target track for writing the data to a magnetic disk of the data storage system and then writing redundant data for the data to the magnetic disk.

7. A secondary data storage system as set forth in claim 6, wherein the means for generating redundant data:
    writes the data to at least two mutually spaced locations on a disk surface.

8. A secondary data storage system as set forth in claim 6, wherein the means for generating redundant data:
    writes the data on different surfaces of a magnetic disk pack.

9. A secondary data storage system as set forth in claim 6, wherein the means for generating redundant data further comprises:
    means for selecting a sector from a group of sectors for parity information generated across the group of sectors;
    means responsive to a write operation directed to a sector in the group for recalculating parity information for the group and rewriting the parity sector with the recalculated parity information.

10. A secondary data storage system as set forth in claim 9, wherein the means for generating redundant data further comprises:
    means for assigning alternating members of a group of sectors to membership in an odd or an even parity subgroup; and means for generating a first parity sector across the odd parity subgroup and a second parity sector across the even parity subgroup.

11. In a disk drive system for a host computer, the disk drive system having a device controller, a memory buffer, at least a first magnetic disk and a read/write magnetic transducer positionable with respect a selected one of a plurality of concentric tracks on a recording surface of each magnetic disk, a method of protecting data stored on the disk drive system from loss due to off track positioning errors of the magnetic transducer during write operations, the method comprising the steps executed by the device controller of:

generating redundant data for data stored on a magnetic disk of the disk drive system;

detecting an off track condition of a magnetic transducer with respect to a target track on the magnetic disk during the write operation;

responsive to detection of the off track condition, stopping the write operation and determining damage to data stored on tracks adjacent the target track; and responsive to detection of damage to the data stored on tracks adjacent to the target track, utilizing the redundant data to repair the data stored on the tracks adjacent the target track.

12. A method as set forth in claim 11, the method further comprising the steps of:

responsive to detection of an off track condition, stopping the write operation until on track operation has been established for a predetermined minimum period and then restarting the write operation.

13. A method as set forth in claim 11, wherein the step of generating redundant data further comprises:

responsive to identification of a target track, reading data from tracks adjacent to the target track and storing the data as redundant data in a memory buffer.

14. A method as set forth in claim 13, and further comprising:

responsive to storage of the data from the adjacent tracks in the memory buffer, allowing a write operation to proceed; and further responsive to detection of damage to data in the adjacent tracks, repeating the write operation to the target track until it completes successfully and executing a write operation to write the back up data to the adjacent tracks, beginning with backing up data in adjacent tracks to the track undergoing the write operation.

15. A method as set forth in claim 11, wherein the step of generating redundant data further comprises:

responsive to a request to back up data without identification of a target track, writing the data to a magnetic disk of the data storage system and then writing redundant data for the data to the magnetic disk.

16. A method as set forth in claim 15, wherein the step of generating redundant data further comprises:

mirroring the data at at least two locations on a disk surface.

17. A method as set forth in claim 15, wherein the step of generating redundant data further comprises:

mirroring the data on at least two different surfaces of a magnetic disk pack.

18. A method as set forth in claim 15, wherein the step of generating redundant data further comprises:

selecting a sector from a group of sectors for parity information generated across the group of sectors;

responsive to a write operation directed to a sector in the group, recalculating parity information for the group and rewriting the parity sector with the recalculated parity information.

19. A method as set forth in claim 18, wherein the step of generating redundant data further comprises:

assigning alternating members of a group of sectors to membership in an odd or an even parity subgroup; and generating a first parity sector across the odd parity subgroup and a second parity sector across the even parity subgroup.

* * * * *